United States Patent
Allen et al.

(10) Patent No.: US 9,160,156 B2
(45) Date of Patent: Oct. 13, 2015

(54) SYSTEM FOR HARVESTING ATMOSPHERIC ELECTRICITY

(75) Inventors: Edward H. Allen, Lancaster, CA (US); Sergey Macheret, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 357 days.

(21) Appl. No.: 13/276,259

(22) Filed: Oct. 18, 2011

(65) Prior Publication Data
US 2013/0093261 A1    Apr. 18, 2013

(51) Int. Cl.
*H05F 7/00* (2006.01)
*H02G 13/00* (2006.01)
*B64D 45/02* (2006.01)

(52) U.S. Cl.
CPC ............... *H02G 13/20* (2013.01); *B64D 45/02* (2013.01); *H05F 7/00* (2013.01)

(58) Field of Classification Search
CPC ........... H02G 13/20; B64D 45/02; H05F 7/00
USPC ................................................ 361/231, 230
See application file for complete search history.

(56) References Cited

U.S. PATENT DOCUMENTS

| | | | | |
|---|---|---|---|---|
| 3,719,829 A | * | 3/1973 | Vaill | 307/149 |
| 4,017,767 A | * | 4/1977 | Ball | 361/117 |
| 4,950,978 A | * | 8/1990 | Govaert | 324/72 |
| 5,726,855 A | * | 3/1998 | Mourou et al. | 361/213 |
| 8,045,314 B2 | * | 10/2011 | Ibok | 361/231 |
| 2014/0231679 A1 | * | 8/2014 | Kremeyer et al. | 250/505.1 |

OTHER PUBLICATIONS

Tzzortzakis et al. "Concatenation of plasma filaments created in air by femtosecond laser infrared laser pulses", 2003, Applied Physics B, vol. 767, pp. 609-612.*
Zhou et al., Revival of femtosecond laser plasma filaments in air by a nanosecond laser, Jun. 24, 2009, Optic Express, vol. 17, No. 14, pp. 1-7.*
Assion et al., "Control of Chemical Reactions by Feedback-Optimized Phase-Shaped Femtosecond Laser Pulses", Science, Oct. 30, 1998, pp. 919-922, vol. 282.

* cited by examiner

*Primary Examiner* — Zeev V Kitov
(74) *Attorney, Agent, or Firm* — Baker Botts L.L.P.

(57) ABSTRACT

Systems, methods and apparatus for harvesting atmospheric electricity are provided. The system includes a laser configured to form a plasma filament and a collector configured to collect electricity flowing along the plasma filament. The plasma filament comprises an electrically conducting plasma filament. Atmospheric electricity may be collected by having the plasma filament form at least a part of a conducting path: (1) between ground and a cloud, (2) between differently charged regions of the same cloud, (3) between differently charged regions of different clouds, and (4) between different regions of atmosphere, where there is a vertical voltage gradient. When the plasma filament is not long enough to form the entire conducting path, a lightning may be triggered to complete the conducting path needed to collect atmospheric electricity.

21 Claims, 6 Drawing Sheets

SYSTEM FOR HARVESTING ATMOSPHERIC ELECTRICITY

STATEMENT REGARDING FEDERALLY SPONSORED RESEARCH OR DEVELOPMENT

Not applicable.

FIELD OF THE INVENTION

The subject technology relates in general to a system for harvesting atmospheric electricity, and more particularly to a system that uses a laser to form an electrically conducting plasma filament for harvesting atmospheric electricity.

BACKGROUND

It is well known that large quantities of electrical energy are present in the atmosphere and in lightning. Lightning was one of the first forms of electricity harnessed in the modern age by Benjamin Franklin in his famous kite experiment.

A lightning discharge typically contains on the order of $10^{10}$ Joules of energy. It has been estimated that the total electrical power of lightning across the Earth is of the order of $10^{12}$ watts. Collection of electrical energy from clouds associated with lightning is a problem that needs to be resolved.

Lightning is but a small part of the total electrical activity of the atmosphere. When a local build up of charge above the Earth exceeds the local breakdown potential of the atmosphere a lightning discharge occurs. However, there is a continual invisible flow of charge from Ionosphere to Earth occurring day and night over the entire surface of the globe, which exceeds the global lightning power output by many times. The source of this flow of charge from the atmosphere to Earth is the Sun. Radiation from the Sun helps form most of the ions found in the Ionosphere, a highly charged region above the atmosphere, through ionization of atmospheric molecules. Solar radiation, particularly in the UV and soft x-ray bands, consist of photons whose energies are well suited to ionization. The Sun also emits continuously a solar wind of positively charged particles. These are captured by the Earth's magnetic field and further contribute to the Ionosphere. The positively charged region in the Ionosphere in turn induces (by electrostatic induction) a negative charge on the surface of the Earth. The Earth becomes in effect an enormous spherical capacitor. A potential gradient or electric field is thus established between the two "plates" of this capacitor, the Ionosphere (or Electrosphere) and the surface of the Earth. While the upper strata of the atmosphere conduct electricity reasonably well, the lower levels act as an insulator or dielectric. Near the surface of the Earth, this electrostatic potential gradient is on the order of about 100 $Vm^{-1}$ in summer, rising to 300 $Vm^{-1}$ in winter. This flow of charge can be tapped and directed to provide useable electrical power. This source of atmospheric electricity has the following advantages: (1) Simple and robust technology; (2) Low cost technology—much cheaper than photovoltaics or wind turbines; (3) Available day and night in all weather conditions—in fact, more power is produced at night than during the day; and (4) Available at any point on the Earth's surface. Collection of this source of atmospheric electricity is another problem that needs to be resolved.

SUMMARY

According to various aspects of the subject technology, a system for harvesting atmospheric electricity is provided that solves some or all of the foregoing problems. In some aspects, the system may be used to harvest atmospheric electricity arising from an electrostatic potential gradient: (1) between ground and a cloud, (2) between differently charged regions of the same cloud, (3) between differently charged regions of different clouds, and (4) between different regions of atmosphere, where there is a vertical voltage gradient. In other aspects, the system may be used to harvest atmospheric electricity arising from an electrostatic potential gradient between the Ionosphere (or Electrosphere) and the surface of the Earth.

According to various aspects of the subject technology, a system for harvesting atmospheric electricity is provided. The system comprises a laser configured to form a plasma filament. The system also comprises a collector configured to collect electricity flowing along the plasma filament.

According to various aspects of the subject technology, a method for harvesting atmospheric electricity is provided. The method comprises forming a plasma filament with a laser. The method also comprises collecting electricity flowing along the plasma filament.

According to various aspects of the subject technology, an apparatus for harvesting atmospheric electricity is provided. The apparatus comprises means for forming a plasma filament with a laser. The system also comprises means for collecting electricity flowing along the plasma filament.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
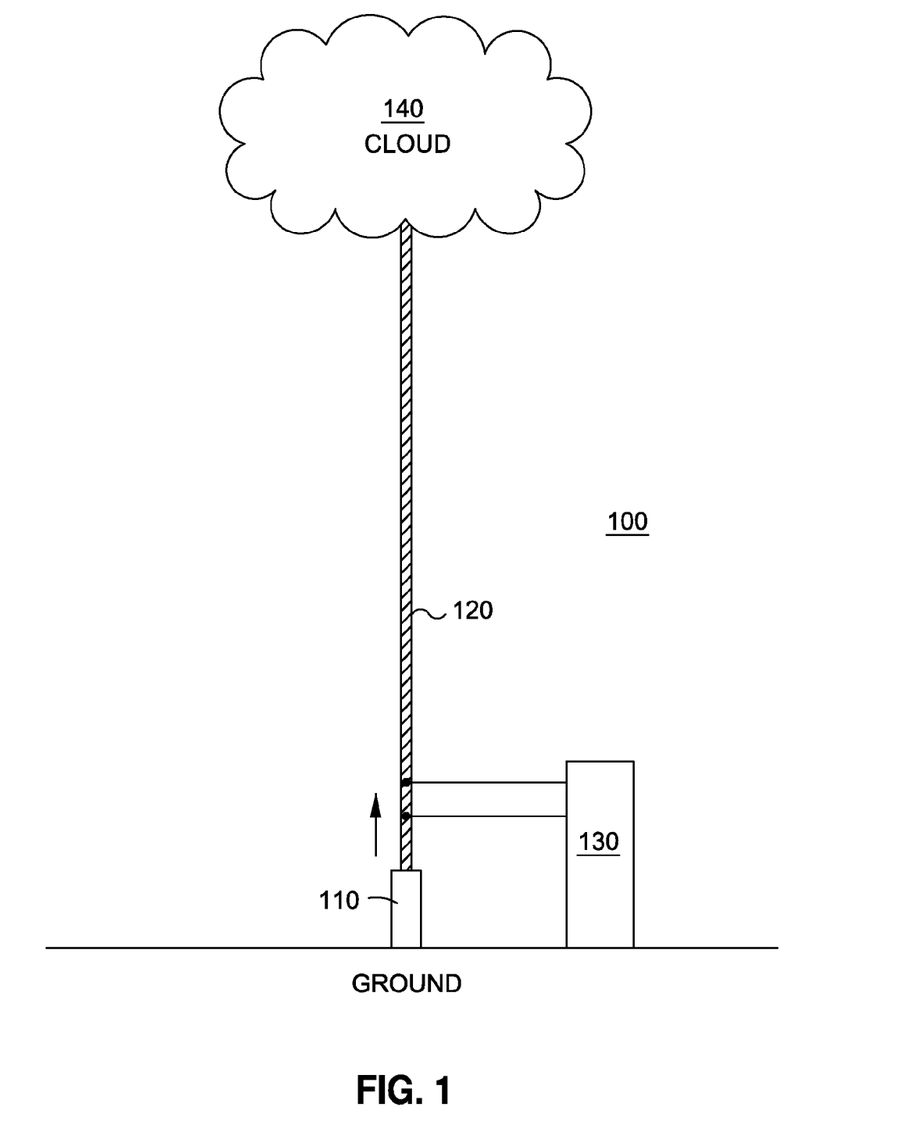
FIG. 1 illustrates a first example of a system for harvesting atmospheric electricity. The system comprises a laser configured to form a plasma filament and a collector configured to collect electricity flowing along the plasma filament. The plasma filament forms a conducting path between ground and a cloud.

FIG. 1 illustrates a first example of a system 100 for harvesting atmospheric electricity. The system 100 comprises a laser 110 configured to form a plasma filament 120 and a collector 130 configured to collect electricity flowing along the plasma filament 120. The plasma filament 120 forms a conducting path between ground and a cloud 140.

The plasma filament 120 comprises an electrically conducting plasma filament. The plasma comprises of electrons and positive ions. The electrically conducting plasma filament may be formed in atmosphere using an ultra short pulse laser (USPL). The USPL forms a plasma filament by raising the conductivity of a very small diameter channel (~100 microns or less) for a very brief time. The propagation of high power (~$10^{14}$ W/cm$^2$) pulses from the USPL is accompanied by filamentation—self-channeling of femtosecond laser pulses in stable high-intensity light filaments with ~100 microns diameters (so that the Kerr effect focusing balances defocusing due to plasma formation). This filamentation keeps the beam virtually free of diffraction divergence. The long plasma strings have high electron densities ($10^{16}$/cm$^3$) which support high conductivities. The ionization of air at these intensities results from multi-photon processes. Filamentation has been produced and detected at altitudes as high as 13-20 km. Almost no beam scattering occurs in filamentation phenomenon, and virtually all the pulse energy is invested in ionization of air molecules. With the typical electron density and channel diameter, a 160 mJ pulse is sufficient to generate a 1 km long channel.

Once initiated, plasma filaments cannot go on forever, and typically only propagate a kilometer or so before energy depletion and exhaustion. However, by using two coaxial USPL projection optics having different time-lensing parameters, a near and far filament could be initiated in a "daisy-chain" to extend the total length of the conductive channel. The onset of filamentation in the far filament is time-lensed to coincide with the exhaustion range of the near filament. Additionally, using negative chirp, femtosecond laser pulses can propagate almost without loss until different frequency components of the wave packet, propagating at different speeds due to dispersion in air, come together at a certain desired location so that the laser intensity there exceeds the filamentation threshold, resulting in long ionized filaments created at a distance of up to several miles from the laser source. In other words, negative chirp is used to essentially focus a beam of the laser at a desired distance to form the plasma filament there. Accordingly, this technique may be used to move the starting point and to extend the length of the plasma filament.

The size, electrical conductivity, and lifetime of the plasma filaments are enhanced by an auxiliary radio-frequency electromagnetic waves or microwaves. The plasma filament may act like an antenna to absorb the auxiliary radio-frequency (RF) electromagnetic waves or microwaves.

The pulsed collection of electric charge and energy is repeated with an optimal (possibly very high) repetition rate of the pulsed laser and of the auxiliary RF waves or microwaves. The energy collected per one pulse should exceed the energy spent on creating and enhancing the plasma filaments, so that the net energy collected is positive. The optimal pulse repetition rate (PRR) depends upon atmospheric conditions which can vary widely over even short time durations. As a general rule, one tries to tune the repetition rate to the plasma relaxation time (the ion-electron recombination time) so that the conductivity of the filament remain as high as is optimal given the atmospheric conditions at the time. A feedback control system that varies the PRR as well as the rest of the pulse-shaping parameters may be employed to optimize the net power production of the system. For more information regarding pulse shaping and tailoring, which is the central theme of the field called "quantum control", please see A. Assion, T. Baumert, M. Bergt, T. Brixner, B. Kiefer, V. Seyfried, M. Strehle, G. Gerber (30 October). "Control of Chemical Reactions by Feedback-Optimized Phase-Shaped Femtosecond Laser Pulses". Science 282 (5390): 919-922. doi: 10.1126/science.282.5390.919. PMID 9794756.

Figure 2:
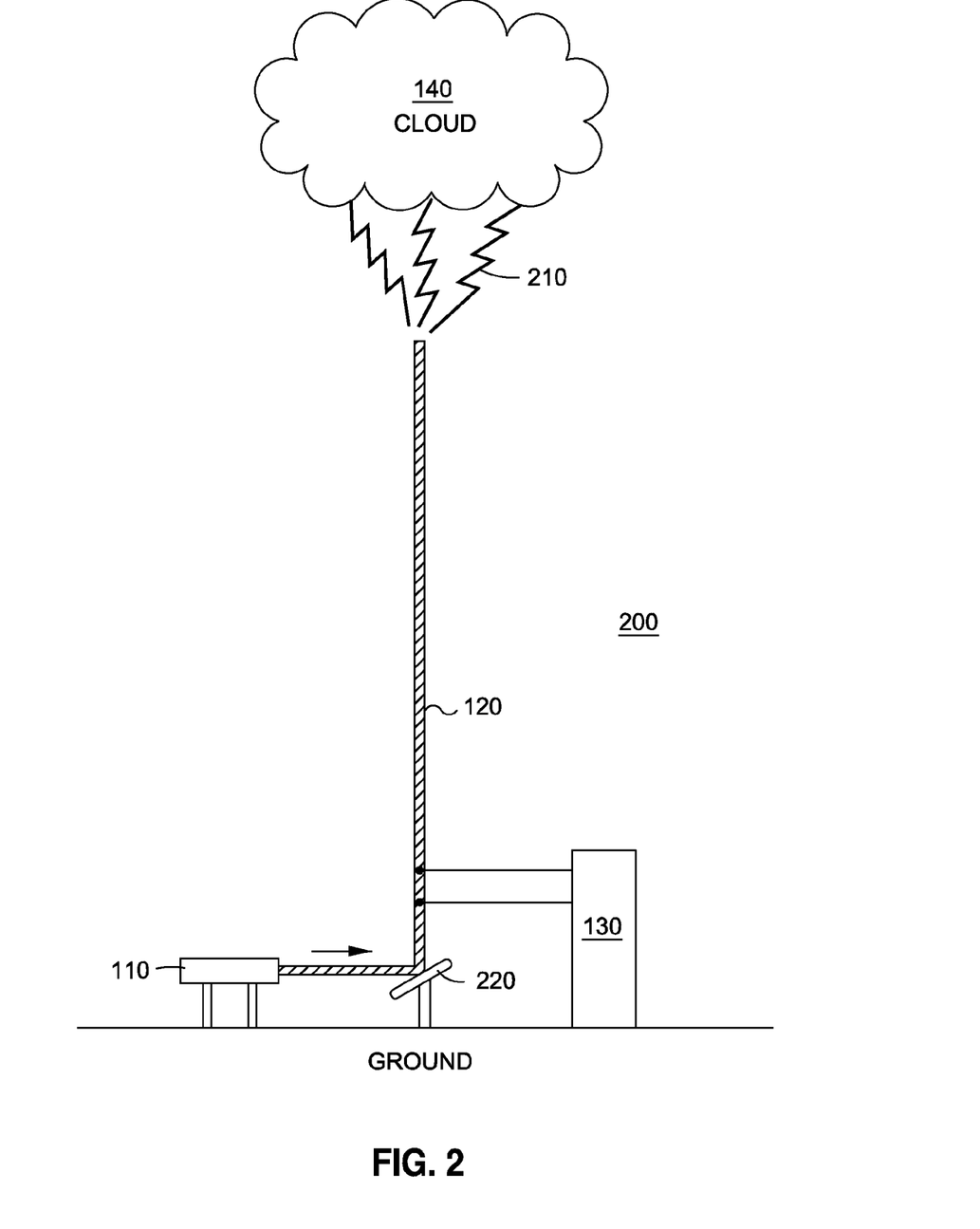
FIG. 2 illustrates a second example of a system for harvesting atmospheric electricity. A plasma filament and a lightning together form a conducting path between ground and a cloud. A condensing mirror directs the beam of laser towards the cloud.

FIG. 2 illustrates a second example of a system 200 for harvesting atmospheric electricity. A plasma filament 120 and a lightning 210 together form a conducting path between ground and a cloud 140. A condensing mirror 220 directs the beam of laser 110 towards the cloud 140. A collector 130 is configured to collect electricity flowing along the plasma filament 120.

In the case of electricity collection from the cloud 140, the initial and RF-enhanced plasma filaments can be relatively short, not reaching all the way from ground to the cloud 140. The relatively short plasma filament can be optimized so that it would trigger propagation of the so-called leader (as in natural lightning), which would effectively use the energy and potential of the cloud to eventually create an electrically conducting path between ground and the cloud 140. The final conducting path would comprise of a plasma filament 120 and a lightning 210.

It is not shown in the figures, but alternatively both the laser 110 and the collector 130 may be placed on a mobile device, which moves together with the cloud. One such mobile device may be a vehicle moving on the ground, but another such mobile device may be an airplane flying in the air. In the case of an airplane flying in the air, plasma filaments may be formed by the laser to reach both ground and the cloud at the same time. In the event the plasma filament directed at ground is not long enough to reach ground, a lightning may also be formed to complete the conducting path to ground.

Figure 3A:
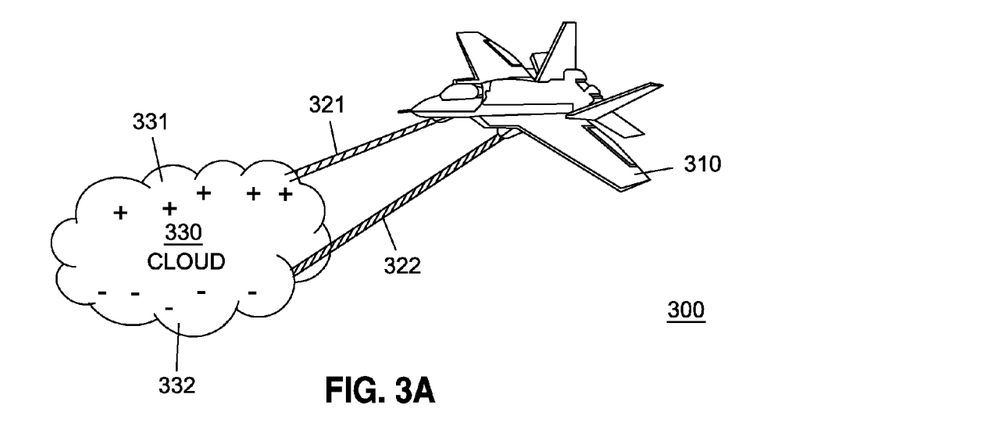
FIG. 3A illustrates a third example of a system for harvesting atmospheric electricity. A laser system situated on an airplane forms two plasma filaments that together complete a conducting path between a first region of a cloud and a second region of the cloud. The first region of the cloud and the second region of the cloud carry opposite electric charges. A collector configured to collect electricity flowing along the two plasma filaments is also situated on the same airplane as the laser system.

FIG. 3A illustrates a third example of a system 300 for harvesting atmospheric electricity. A laser system situated on an airplane 310 forms two plasma filaments (321, 322) that together complete a conducting path between a first region 331 of a cloud 330 and a second region 332 of the cloud 330. The first region 331 of the cloud 330 and the second region 332 of the cloud 330 carry opposite electric charges. In the example shown here, the first region 331 of the cloud 330 carries positive electric charges, while the second region 332 of the cloud 330 carries negative electric charges. A collector configured to collect electricity flowing along the two plasma filaments is also situated on the same airplane 310 as the laser. Positive and negative charges are naturally separated within the cloud, so this example makes use of the electrostatic potential gradient between different regions of the same cloud.

Figure 3B:
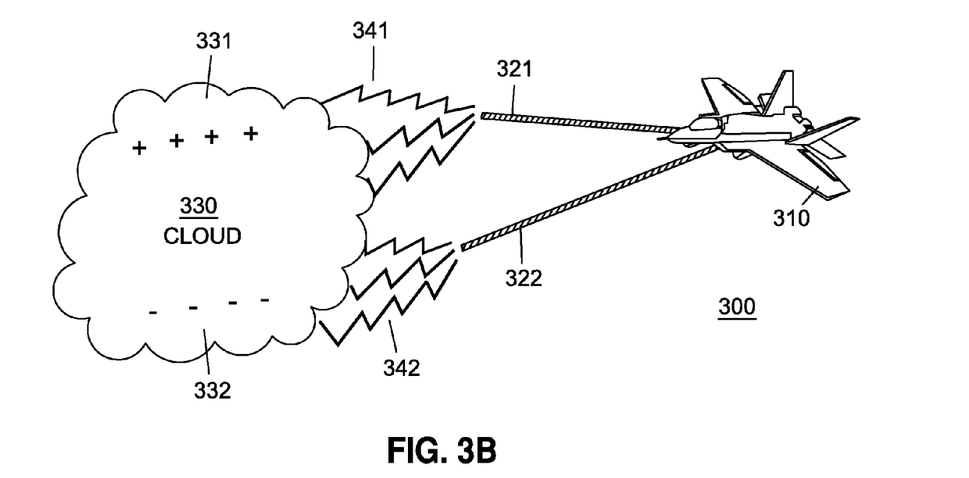
FIG. 3B illustrates a fourth example of a system for harvesting atmospheric electricity. It is similar to FIG. 3A, except two lightnings complete the conducting path between a first region of a cloud and a second region of the cloud (i.e., a first lightning electrically connects the first region of the cloud to one of the plasma filaments and a second lightning electrically connects the second region of the cloud to the other plasma filament).

FIG. 3B illustrates a fourth example of the system 300 for harvesting atmospheric electricity. It is similar to FIG. 3A, except two lightnings (341, 342) complete the conducting path between a first region 331 of a cloud 330 and a second region 332 of the cloud 330 (i.e., a first lightning 341 electrically connects the first region 331 of the cloud 330 to one of the plasma filaments 321 and a second lightning 342 electrically connects the second region 332 of the cloud 330 to the other plasma filaments 322). The lightning formation is again because the initial and RF-enhanced plasma filaments can be relatively short, not reaching all the way from the collector situated on airplane 310 to the cloud 330. These relatively short plasma filaments can be optimized so that they would trigger propagation of the so-called leader (as in natural lightning), which would eventually create an electrically conducting path between the two regions of cloud 330 via a connection through airplane 310. The final conducting path would comprise of two plasma filaments (321, 322) and two lightnings (341, 342). Of course, one of the lightnings may not be formed, if one of the plasma filament can reach all the way from airplane 310 to cloud 330.

Figure 4:
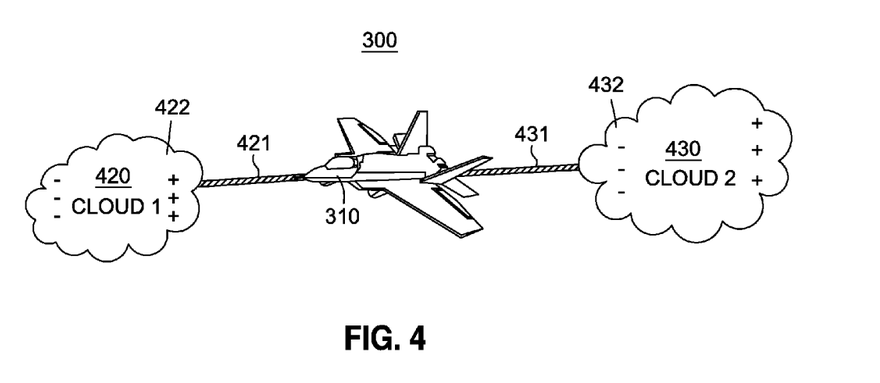
FIG. 4 illustrates a fifth example of a system for harvesting atmospheric electricity. A laser system situated on an airplane forms two plasma filaments that together complete a conducting path between a first cloud and a second cloud. The region of the first cloud that is connected to the first plasma filament and the region of the second cloud that is connected to the second plasma filament carry opposite electric charges.

FIG. 4 illustrates a fifth example of the system 300 for harvesting atmospheric electricity. A laser system situated on an airplane 310 forms two plasma filaments (421, 431) that together complete a conducting path between a first cloud 420 and a second cloud 430. The region 422 of the first cloud 420 that is connected to the first plasma filament 421 and the region 432 of the second cloud 430 that is connected to the second plasma filament 431 carry opposite electric charges. In the example shown here, region 422 of cloud 420 carries positive electric charges, while region 432 of cloud 430 carry negative electric charges. Positive and negative charges are naturally separated within the cloud, so this example makes use of the electrostatic potential gradient between different regions of different clouds. Once again, in case one of the plasma filament cannot reach all the way from airplane 310 to any one of the clouds, then lightning may be formed to complete an electrically conducting path from airplane 310 to any one of the clouds. But these embodiments are not shown in the figures.

Figure 5:
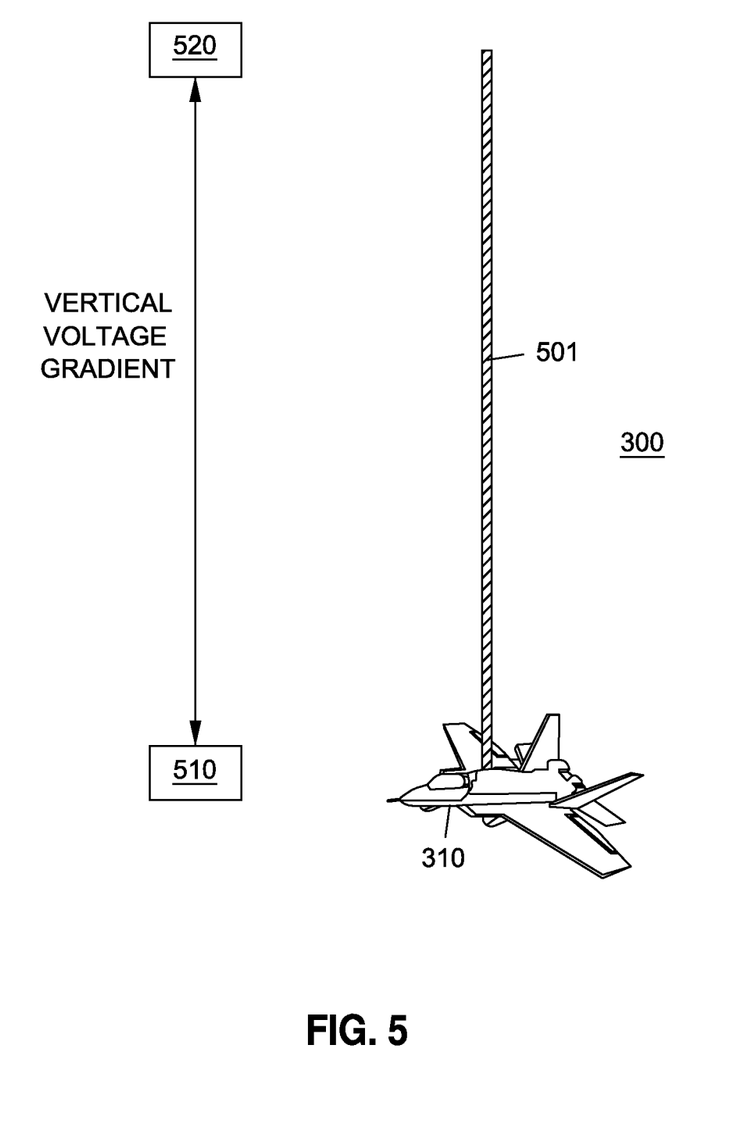
FIG. 5 illustrates a sixth example of a system for harvesting atmospheric electricity. A laser situated on an airplane forms a plasma filament that completes a conducting path between a first region of atmosphere and a second region of atmosphere. A collector situated on the same airplane as the laser can collect electricity flowing along the plasma filament, because a vertical voltage gradient exists between the first region of atmosphere and the second region of atmosphere.

FIG. 5 illustrates a sixth example of the system 300 for harvesting atmospheric electricity. A laser system situated on an airplane 310 forms a plasma filament 501 that completes a conducting path between a first region 510 of atmosphere and a second region 520 of atmosphere. A collector situated on the same airplane 310 as the laser system can collect electricity flowing along the plasma filament 501, because a vertical voltage gradient exists between the first region 510 of atmosphere and the second region 520 of atmosphere. Because no clouds are needed for this embodiment, atmospheric electricity collection is possible under fair weather conditions (relying on the naturally existing vertical voltage gradient in the atmosphere) as well as under foul weather conditions.

Figure 6:
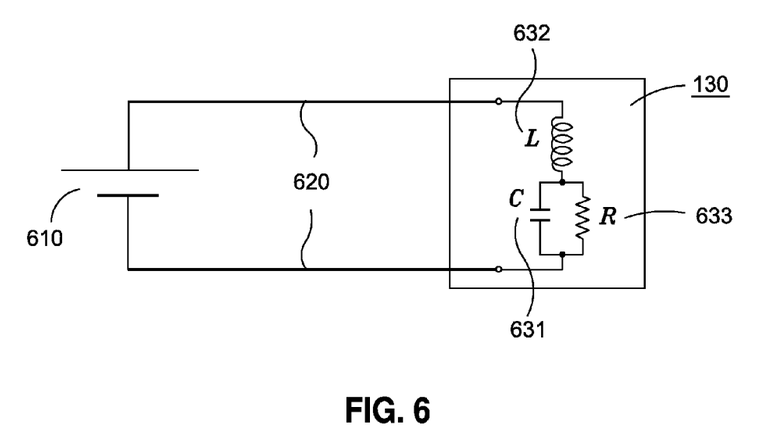
FIG. 6 illustrates an example of a collector configured to collect electricity flowing along the plasma filament. The collector may be a charge collection circuit characterized by capacitance, inductance, and resistance. The electricity may be collected by charging a capacitor.

FIG. 6 illustrates an example of a collector 130 configured to collect electricity flowing along a plasma filament 620. The collector may be a charge collection circuit characterized by capacitance 631, inductance 632, and resistance 633. The electricity may be collected by charging a capacitor associated with capacitance 631. Battery 610 represents these naturally existing voltage sources: (1) between ground and a cloud, (2) between differently charged regions of the same cloud, (3) between differently charged regions of different clouds, and (4) between different regions of atmosphere, where there is a vertical voltage gradient. The plasma filament 620 can, for the purpose of analysis and optimization of the charge collection process, be viewed as electromagnetic transmission lines characterized by their effective capacitance, inductance, and resistance per unit length. Accordingly, the parameters of the charge collection circuit and of the effective transmission line representing the plasma filaments are optimized, so as to maximize the net charge and energy collected (minus the energy spent on generating and enhancing the plasma filaments).

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is the following:

1. A system for harvesting atmospheric electricity, comprising:
    a laser configured to form a plasma filament comprising at least a first filament and a second filament, wherein onset of formation of the second filament coincides with an exhaustion range of the first filament;
    an auxiliary source of electromagnetic energy operable to enhance the plasma filament by applying electromagnetic energy to the plasma filament; and
    a collector configured to collect electricity flowing along the plasma filament.
2. The system of claim 1, wherein the plasma filament comprises an electrically conducting plasma filament.
3. The system of claim 1, wherein the laser is a pulsed laser.
4. The system of claim 3, wherein the pulsed laser is pulsed at an optimal repetition rate.
5. The system of claim 1, wherein the electromagnetic energy comprises at least one of radio-frequency energy or microwave energy.
6. The system of claim 1, wherein the plasma filament forms at least a part of a conducting path between ground and a cloud.
7. The system of claim 6, wherein at least one lightning forms another part of the conducting path between ground and the cloud.
8. The system of claim 1, wherein the plasma filament forms at least a part of a conducting path between a first region of a cloud and a second region of the cloud.
9. The system of claim 8, wherein at least one lightning forms another part of the conducting path between the first region of the cloud and the second region of the cloud.
10. The system of claim 1, wherein:
    the laser is further configured to form a second plasma filament,
    the plasma filament is connected to a region of a first cloud, and
    the second plasma filament is connected to a region of a second cloud.
11. The system of claim 1, wherein the plasma filament completes a conducting path between a first region of atmosphere and a second region of atmosphere.
12. The system of claim 11, wherein a vertical voltage gradient exists between the first region of atmosphere and the second region of atmosphere.
13. The system of claim 1, wherein the collector comprises a charge collection circuit.
14. The system of claim 1, wherein the laser is situated on ground.
15. The system of claim 1, wherein the laser is situated on a mobile device.
16. The system of claim 15, wherein the mobile device is an airplane.
17. The system of claim 1, wherein negative chirp is used to move the starting point of formation of the plasma filament to a desired location.
18. A method for harvesting atmospheric electricity, the method comprising:
    forming a plasma filament with a laser, wherein the plasma filament comprises at least a first filament and a second filament, and wherein onset of formation of the second filament coincides with an exhaustion range of the first filament;
    applying electromagnetic energy to the plasma filament to enhance the plasma filament; and
    collecting electricity flowing along the plasma filament.
19. An apparatus for harvesting atmospheric electricity, the apparatus comprising:
    means for forming a plasma filament with a laser, wherein the plasma filament comprises at least a first filament and a second filament, and wherein onset of formation of the second filament coincides with an exhaustion range of the first filament;
    means for applying electromagnetic energy to the plasma filament to enhance the plasma filament; and
    means for collecting electricity flowing along the plasma filament.
20. The system of claim 1, wherein the laser is an ultra short pulse laser (USPL).
21. The system of claim 1, wherein the laser comprises two coaxial USPL projection optics having different time-lensing parameters.

* * * * *